US007609138B2

(12) United States Patent
Dietrich et al.

(10) Patent No.: US 7,609,138 B2
(45) Date of Patent: Oct. 27, 2009

(54) ROTARY SELECTOR

(75) Inventors: Mike Dietrich, Bornow (DE); Wolfgang Mücke, Berlin (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 0 days.

(21) Appl. No.: 11/048,606

(22) Filed: Jan. 31, 2005

(65) Prior Publication Data

US 2005/0190029 A1     Sep. 1, 2005

Related U.S. Application Data

(63) Continuation of application No. PCT/EP03/06862, filed on Jun. 27, 2003.

(30) Foreign Application Priority Data

Jul. 31, 2002   (DE)   ................................ 102 34 923

(51) Int. Cl.
    *H01H 9/00*   (2006.01)
(52) U.S. Cl. ..................... 335/205; 335/207; 338/32 H; 200/564
(58) Field of Classification Search .............. 324/207.2, 324/207.21, 207.25, 207.5; 335/205–207; 200/561, 564, 567; 338/32 H
    See application file for complete search history.

(56) References Cited

U.S. PATENT DOCUMENTS

| 4,054,860 A | * | 10/1977 | Henderson et al. ........ 338/32 H |
| 4,395,695 A | | 7/1983 | Nakamura |
| 4,800,740 A | * | 1/1989 | Huttemann ................ 68/12.12 |
| 4,983,812 A | | 1/1991 | Worrall et al. |
| 5,148,106 A | * | 9/1992 | Ozawa ................... 324/207.21 |
| 5,668,359 A | * | 9/1997 | Alvord et al. ............... 200/6 B |
| 5,757,180 A | * | 5/1998 | Chou et al. ............... 324/207.2 |
| 6,100,476 A | * | 8/2000 | Adamietz et al. .............. 200/4 |
| 6,935,142 B2 | * | 8/2005 | Musser et al. .............. 68/12.16 |
| 7,038,156 B2 | * | 5/2006 | Kim et al. ................... 200/564 |
| 2003/0020465 A1 | * | 1/2003 | Wolf ....................... 324/207.2 |
| 2003/0024796 A1 | * | 2/2003 | Peterson et al. ........... 200/11 R |
| 2003/0178290 A1 | | 9/2003 | Schilling |
| 2004/0257068 A1 | * | 12/2004 | Wolber et al. .......... 324/207.12 |

FOREIGN PATENT DOCUMENTS

DE         2 040 464         2/1972

(Continued)

OTHER PUBLICATIONS

International Search Report PCT/EP2003/006862.

*Primary Examiner*—Elvin G Enad
*Assistant Examiner*—Bernard Rojas
(74) *Attorney, Agent, or Firm*—James E. Howard

(57) ABSTRACT

The invention concerns a rotary selector as control device for switching on and off and automatic control of a number of different program steps of electrical appliances such as washing machines, tumble dryers, dishwashers and the like. The rotary selector in the invention functions as a control device for switching on and off and automatic control of a number of different program steps of electrical appliances such as washing machines, tumble dryers, dishwashers and the like. This is done by connecting a pivoted actuator (3) via an operating shaft (4) with a magnetic rotary field sensor (5) in Hall sensor technology. An interface is integrated into the rotary field sensor (5), via which an angle-dependent code is transmitted to an electronic evaluation and control unit. In addition there is a device for positioning the actuator (3) at a precise angle, whereby a particular program cycle is assigned to each setting of the rotary field sensor (5) and each switch position of the actuator (3).

19 Claims, 1 Drawing Sheet

FOREIGN PATENT DOCUMENTS

| | | |
|---|---|---|
| DE | 25 10 816 | 3/1976 |
| DE | 38 23 812 A1 | 2/1990 |
| DE | 39 18 712 A1 | 12/1990 |
| DE | 44 32 399 A1 | 3/1996 |
| DE | 44 39 157 A1 | 5/1996 |
| DE | 196 48 500 C1 | 3/1998 |
| DE | 100 59 036 A1 | 5/2002 |
| EP | 0 159 616 A1 | 10/1985 |
| EP | 0 565 926 A1 | 10/1993 |
| EP | 0 867 792 B1 | 9/1998 |
| FR | 2 595 835 A1 | 9/1987 |
| GB | 1 376 927 | 12/1974 |

\* cited by examiner

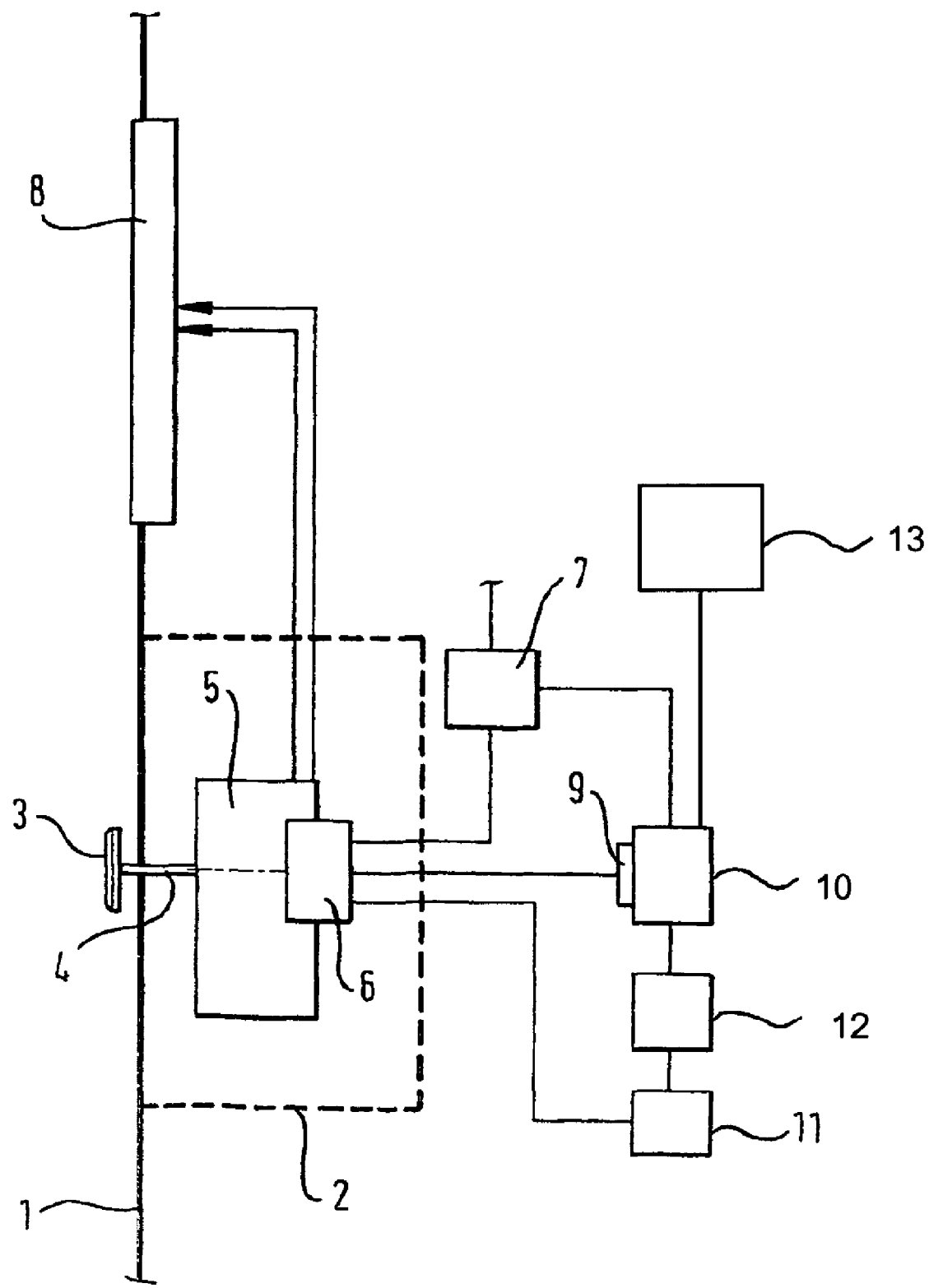

ROTARY SELECTOR

The invention concerns a rotary selector as a control device to switch on and off and automatically control a number of different program sequences of electrical appliances such as washing machines, tumble dryers, dishwashers and the like.

State-of-the-art rotary selectors are normally designed as a mechanical assembly, used not only for switching the respective appliance on and off but also connected to a program controller which controls a pre-selected number, type and duration of program sequences.

Program controllers as per the state-of-the-art known solutions (DE-PS 20 40 464, 21 55 354 B1, 25 10 816 B1, 34 13 858 A1 or 36 07 953 C2) usually feature a program drum or roller used for the program sequence and designed to trigger separately the various operations of the respective program selected.

Furthermore, the program controller also performs the switching operation for changing the direction of rotation of a motor, for example for a washing drum in a washing machine, whereby both program drum and reversing drum are actuated by a transport ratchet controlled separately by gearing.

In these solutions additional time-setting elements are provided for sequencing the respective operations; these take the form of timer gears, timer rings or a multiple time ring connected to the program drum.

Furthermore, there is an improved device of the abovementioned kind, an electromechanical program controller for an appliance, known from DE 3918712; this device is supposed to make it possible to freely select an additional time period for an additional program step without needing a separate drive.

This known program controller for household appliance control provides for a program drum and for example a reversing drum or an electric motor-driven control disc as well as a time selector drum for setting an additional time.

In this solution the time selector drum features at least one cam disc for at least one switch contact and a drive gear assembly engaging with a drive element. The drive element is connected to the cam disc in such a way, for example via a detentable key lever on the program drum, that the drive element is not enabled until the program drum is in a position pre-set as an additional time.

A particular disadvantage of the known state-of-the-art solutions is that generally a large number of mechanical components have to be accommodated on one operating shaft; and that most of these components will have to have separate spring-loading, pivot, pawls and drive motors.

In addition, these solutions require ratchet wheels with different gearing, into which the abovementioned pawls engage, which means that the contacts of the rotary selector have to be assigned to each angle position by mechanical means.

As the state-of-the-art rotary selector uses a large number of components and assemblies entailing high-precision fabrication, it is expensive to manufacture, and there are also additional calibration costs to allow it to be used in corresponding appliances.

On the basis of the current state-of-the-art solutions the purpose of the invention is to create a rotary selector for the program control of household appliances which will be inexpensive to manufacture and universally applicable over a wide range.

Building on the solutions mentioned above, this aim is achieved by the features detailed in the main claim. Beneficial designs and further developments of the invention are described in the appurtenant sub-claims.

In a favourable way the invention achieves an overall reduction in development and manufacturing costs for the rotary selector, improved functions, extended range of application and substantially increased service life.

Furthermore, the new rotary selector is significantly smaller than the known solutions, thus reducing the amount of material used and the space requirement in the respective appliance e.g. automatic washing machine.

Compared to the known solutions the rotary selector in this invention works with magnetic recognition of the switch position using Hall effect sensor technology, so that the selector is non-contact, thus completely preventing wear and any resulting malfunctions at the main switching positions, and in addition increasing the operational range.

In proportion to the service life or durability of the entire appliance, the pivot bearing which is required only in the area of the bearing assembly for the operating shaft is negligible and therefore of no import.

The operational range is enhanced in particular by the fact that two hundred and fifty six (256) switching positions in the range between 0° and 360° are achievable, as compared to the known solutions.

In addition, compared to the previous invention, this new rotary selector is not sensitive to heat and therefore can be used in an operating temperature range of up to 120° C.

The measure envisaged in an initial design of the invention is particularly suitable for processing and displaying the respective status of the current program in an appropriate way.

To do so the further design makes provision for the relevant values to be transmitted to a suitable display arranged on a certain position on the housing for optical representation and identification.

The following enhancements are particularly suited to carry out, in a known way, control of the heating and of at least one motor, e.g. for driving the washing drum of a washing machine. Furthermore, these measures are suitable both for controlling supply and discharge of media and for enabling additional external appliances to be connected.

The invention is described in more detail below in a design example with the one diagram provided.

In this diagram the housing of an appliance, e.g. an automatic washing machine, is identified as FIG. 1.

Within housing 1 a rotary selector 2 is foreseen at a suitable operating position accessible from the outside. Rotary selector 2 is usually arranged with an actuator 3 outside a wall, not designated more precisely, on housing 1, and is connected to a positioning device 6 via a pivoted operating shaft 4 to a fixed rotary field sensor 5 arranged at its housing-side end.

In the described design example the rotary field sensor is fixed in place in the usual way using its housing with suitable fasteners, which are not shown in more detail, on housing 1 in a good ergonomic location for the person using the appliance.

The power supply normally necessitates an appropriate switch unit, here designed as optional mains switch 7 and connected to the respective components and assemblies via cable which is not described in more detail. In addition, a display device 8 is arranged at a suitable position, and is designed for example as a display showing the functions and operating status of the respective appliance. The data required for the display are transmitted using appropriate means via cable connections (not described more precisely) from the componentry of rotary selector 2 to display 8.

The washing machine described in the design example is normally fitted with a motor control 9 and a suitable motor 10, with which the various drum 13 movements for the individual washing, rinsing and spinning cycles are controlled in accordance with the program.

For the functioning of the appliance in accordance with the design example it is absolutely essential that the supply and discharge of water for washing and subsequent rinsing are controlled.

This is done by means of appropriate devices designated items 11 and 12, for example at least one valve and a pump.

The following text describes how the rotary selector in the present invention works:

The rotary selector acts as a control device for switching on and off and automatic control of a number of different programs of electrical appliances such as washing machines, tumble dryers, dishwashers and the like. A pivoted actuator (3) is connected via an operating shaft (4) with a magnetic rotary field sensor (5) in Hall sensor technology. An interface is integrated into the rotary field sensor (5), via which an angle-dependent code is transmitted to an evaluation and control unit. In addition provision has been made for a device (6) for positioning the actuator (3) at a precise angle, whereby a particular program cycle is assigned to each setting of the actuator (3) and switch position of the rotary field sensor (5).

The rotary selector communicates with the electronic evaluation and control unit using a universally applicable interface, e.g. a serial interface, and depending on position and/or switch setting, transmits an angle-dependent code to the electronic evaluation and control unit.

In the present invention the complete 360° angle of rotation is divided up into two hundred and fifty six (256) bit patterns, whereby a program step can be assigned to each bit pattern of the electronic evaluation and control unit.

Compared to the state-of-the-art solutions, a particular advantage of the new rotary selector is that the new invention allows a large number of different applications to be selected and controlled in a flexible and infinitely variable manner.

In this way almost any program variation can be easily produced simply by programming the evaluation and control unit, and the rotary selector itself can therefore be used universally for programming and control in the most varied fields of application for all conceivable electrical appliances.

Previously the fixed mechanical structure of conventional rotary selectors has not allowed any random position changes. In the present invention the variability of position changes along the circumference of the actuator (3) is achieved by the high resolution of the magnetic rotary field sensor (5). Appropriate programming can make selector switches available for infinitely variable switching positions of 8, 10, 12, and 16 up to 256.

In addition to this increase in program variation, reducing the duration of the development period brings down development costs and moreover, it is easier to produce special variants of rotary selectors. The availability of components increases while the development risk is reduced.

There are also savings in relation to the electronic evaluation and control unit, since only one standardised communication interface is required.

Moreover, compared to conventional solutions, high resolution encoding allows the information on the display to be represented in a more detailed form.

A particular advantage is that the Hall sensor technology results in non-wearing switch positions and thus contacts in rotary selectors which have previously been subject to wear and abrasion can be replaced by the rotary selectors in this invention.

The invention claimed is:

1. A rotary selector for controlling a household appliance, the selector switching the appliance on and off and controlling multiple program sequences for the appliance, the selector comprising:
    a magnetic rotary field sensor;
    a pivoted actuator connected to the rotary field sensor in Hall sensor technology;
    an interface integrated into the rotary field sensor and transmitting an angle-dependent code;
    an electronic evaluation and control unit connected to the interface and receiving the angle-dependent code; and
    a positioning device for positioning the actuator at a precise angle in relation to the rotary field sensor representing a setting, a particular program sequence being assigned to each setting of the rotary field sensor and each switch position of the actuator, the Hall technology providing non-contact positions, wherein the assignment of program sequences to the switch positions of the actuator is freely programmable.

2. The rotary selector of claim 1, wherein the rotary field sensor allows the encoding of 256 positions and the positioning device has positions corresponding to the number of program steps required.

3. The rotary selector of claim 1, further comprising a display unit connected to the electronic evaluation and control unit for displaying data.

4. The rotary selector of claim 1, wherein the interface integrated into the rotary field sensor and transmitting an angle-dependent code includes a serial interface.

5. The rotary selector of claim 1, wherein the household appliance has a housing, an operating shaft extending through the housing and connecting the actuator and the rotary field sensor to one another, the actuator and the rotary field sensor being disposed on opposite sides of the housing.

6. The rotary selector of claim 1, wherein the household appliance includes a selected one of a washing machine, a dryer, and a dishwasher.

7. A washing machine comprising:
    a housing;
    a drum at least partially disposed within the housing and mounted for rotation with respect to the housing;
    a rotary selector supported by the housing and for controlling the washing machine, the rotary selector having a magnetic rotary field sensor;
    a pivoted actuator connected to the magnetic rotary field sensor in non-contacting Hall sensor technology, the rotary selector having multiple settings representing the position of the actuator in relation to the rotary field sensor;
    an interface integrated into the rotary field sensor and transmitting an angle-dependent code indicating the setting;
    a control unit connected to the interface and receiving and evaluating the angle-dependent code, the control unit storing multiple pre-set program sequences for controlling operation of the washing machine; and
    a positioning device for positioning the actuator at a specific setting, at least one particular program sequence being assigned to at least one corresponding setting of the rotary field sensor, wherein the assignment of the program sequence to the corresponding setting of the rotary field sensor is programmable to permit an assignment of a program sequence assigned to a respective corresponding setting of the rotary field sensor that is different than an earlier assigned program sequence that had been assigned to the respective corresponding setting of the rotary field sensor by the completion of manufacturing of the washing machine.

8. A method of controlling a household appliance having an electronic control unit, the method comprising the following acts:
provide a rotary selector having a pivoted actuator and a magnetic field rotary sensor connected to the pivoted actuator in non-contacting Hall sensor technology;
providing an interface electrically connecting the rotary selector and the control unit for transmitting data;
freely programming the control unit to allocate specific program sequences to corresponding positions of the actuator in the rotary field sensor;
moving the actuator to a desired position;
sensing the position of the actuator in relation to the rotary field sensor with the rotary field sensor;
transmitting a signal to the control unit with the interface indicating the position of the actuator in relation to the rotary field sensor;
determining the specific program sequence corresponding to the signal; and
performing the specific program sequence to control operation of the appliance.

9. The method of claim 8, further comprising the act of displaying data on a display unit electrically connected to the control unit.

10. A rotary selector for a household appliance, the rotary selector comprising:
a magnetic rotary field sensor having a Hall sensor capability;
an actuator, the actuator being movable about an actuator axis to a plurality of angular setting positions, the actuator being operatively associated with the magnetic rotary field sensor such that the magnetic rotary field sensor senses in a non-contact manner each of the plurality of angular setting positions to which the actuator is moved, and one of the plurality of angular setting positions to which the actuator can be moved is one designated angular setting position and another of the plurality of angular setting positions to which the actuator can be moved is a further designated angular setting position; and
a device for providing a signal, the signal providing device being operable to provide, in response to a sensing by the magnetic rotary field sensor that the actuator is in the one designated angular setting position, a first signal corresponding to a first set of operational parameters for the household appliance and for providing, in response to a sensing by the magnetic rotary field sensor that the actuator is in the one designated angular setting position, a second signal corresponding to a second set of operational parameters for the household appliance different than the first set of operational parameters, the device including an interface integrated into the rotary field sensor and transmitting an angle-dependent code, an electronic evaluation and control unit connected to the interface and receiving the angle-dependent code, a positioning device for positioning the actuator at a precise angle in relation to the magnetic rotary field sensor at each of the plurality of angular setting positions of the actuator, and a component for receiving an input to switch the device from providing the first signal to providing the second signal, the electronic evaluation and control unit being programmable to associate the first signal corresponding to the first set of operational parameters for the household appliance to the one designated angular setting position by the completion of the manufacturing of the household appliance and being programmable to associate the second signal corresponding to the second set of operational parameters for the household appliance to the one designated angular setting position at a time after the completion of the manufacturing of the household appliance.

11. The rotary selector of claim 10, wherein the rotary selector is operable in a household appliance in the form of a clothes washing machine having a housing and a drum at least partially disposed within the housing and mounted for rotation with respect to the housing and the rotary selector is supported by the housing and is operable to control at least some of the operations of the washing machine.

12. The rotary selector of claim 10, wherein the rotary selector has two hundred and fifty six (256) settings.

13. The rotary selector of claim 10 and further comprising a display unit supported by the housing and connected to the control unit for displaying data.

14. The rotary selector of claim 10, wherein the interface integrated into the rotary field sensor and transmitting an angle-dependent code indicating a setting includes a serial interface.

15. The rotary selector of claim 10 and further comprising an operating shaft extending through the housing and connecting the actuator and the rotary field sensor to one another, the actuator and the rotary field sensor being disposed on opposite sides of the housing.

16. The rotary selector of claim 10, wherein the program sequences control movement of the drum.

17. The rotary selector of claim 10, wherein the program sequences control the volume and temperature of a liquid within the drum.

18. The rotary selector of claim 10, wherein the first set of operational parameters and the second set of operational parameters both relate the operation of a selected one of a washing machine, a dryer, and a dishwasher.

19. The rotary selector of claim 18, wherein the electronic evaluation and control unit is operable to implement the respective one of the first set of operational parameters and the second set of operational parameters that is associated with the one designated angular setting position in connection with a disposition of the rotary selector at the one designated angular setting position and is operable to implement of the other of the first set of operational parameters and the second set of operational parameters in connection with a disposition of the rotary selector at the further designated angular setting position.

* * * * *